United States Patent
Atake

(12) 
(10) Patent No.: US 6,343,918 B1
(45) Date of Patent: Feb. 5, 2002

(54) SHEET DECORATION INJECTION MOLDING MACHINE UTILIZING A FLAT OR NON-CONTACT TYPE HOT PLATE

(75) Inventor: Hiroyuki Atake, Tokyo-To (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 0 days.

(21) Appl. No.: 08/960,897

(22) Filed: Oct. 30, 1997

(30) Foreign Application Priority Data

Oct. 31, 1996 (JP) .............................................. 8-290660

(51) Int. Cl.[7] .............................................. B29C 45/72
(52) U.S. Cl. ....................... 425/112; 264/266; 264/513; 425/127; 425/129.1; 425/DIG. 13; 425/DIG. 245
(58) Field of Search ................................ 264/266, 510, 264/513, 550, 370; 425/112, 129.1, 388, DIG. 13, DIG. 205, 127, 190; 432/33, 34, 225; 219/453.12, 453.13

(56) References Cited

U.S. PATENT DOCUMENTS 5,676,981 A * 10/1997 Miyazawa et al. .......... 425/112
5,730,825 A * 3/1998 Atake .......................... 156/246
5,843,555 A * 12/1998 Ataket et al. .................. 428/98

FOREIGN PATENT DOCUMENTS

| EP | 0 329 792 A | 8/1989 |
| JP | 57-39940 | 3/1982 |
| JP | 57-047632 | 3/1982 |
| JP | 7-227877 | * 8/1995 |
| WO | WO96/03268 | 2/1996 |

* cited by examiner

Primary Examiner—Jan H. Silbaugh
Assistant Examiner—Edmund H. Lee
(74) Attorney, Agent, or Firm—Morgan & Finnegan, L.L.P.

(57) ABSTRACT

A sheet-decorating injection molding machine is provided with a female mold, a male mold, a sheet clamper for fixedly holding a decorative sheet on a parting surface of the female mold, and a hot plate having a first heating plate and a second heating plate jointed at corresponding edges thereof in a V-shape. The heating surfaces of the first and second heating plates face the female mold. The V-shaped hot plate is moved to a position near the decorative sheet held by the sheet clamper on the female mold to heat the decorative sheet uniformly.

9 Claims, 9 Drawing Sheets

FIG. I

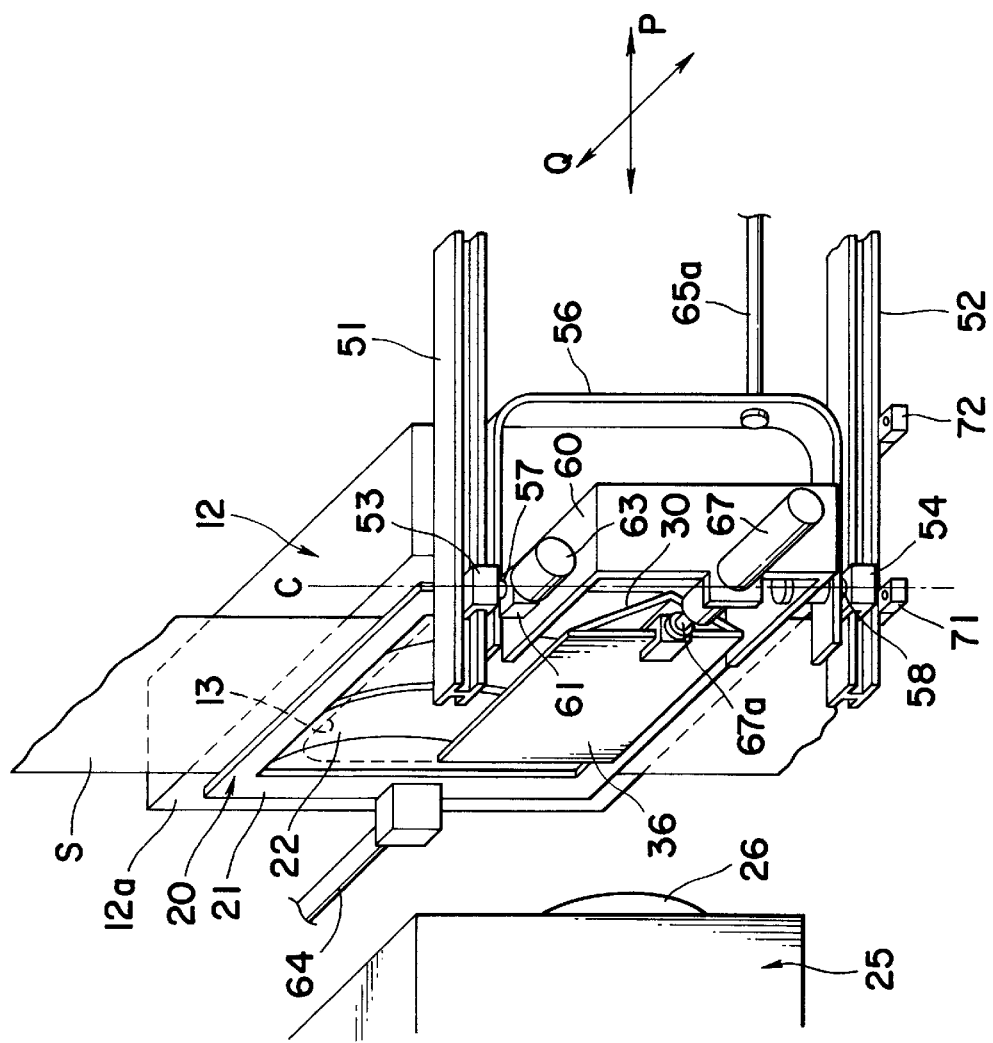
F I G. 3

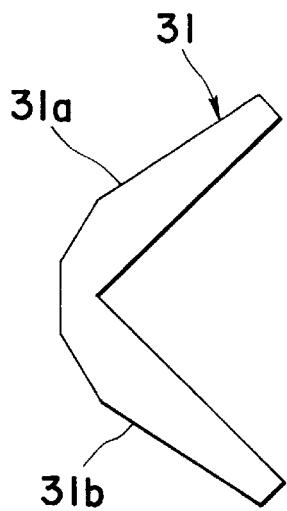 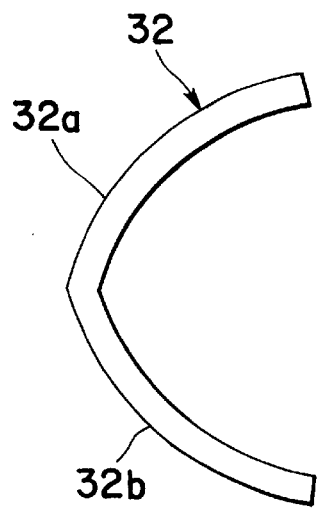
FIG. 6(A)  FIG. 6(B)
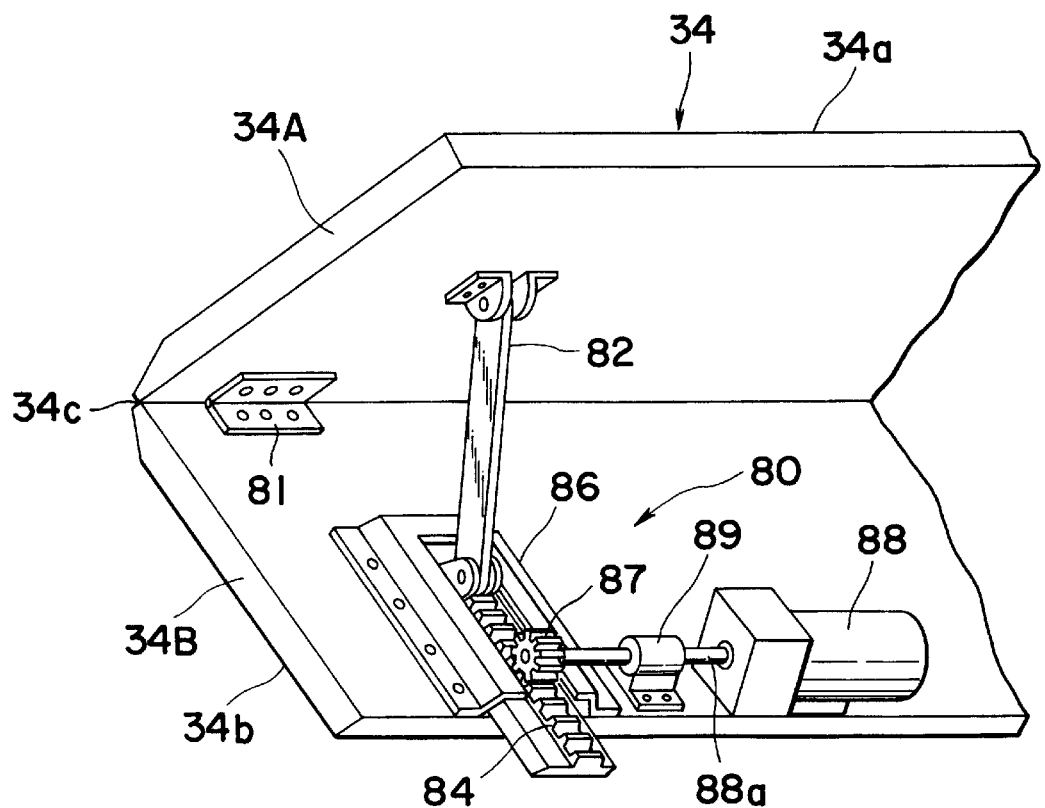
FIG. 7

SHEET DECORATION INJECTION MOLDING MACHINE UTILIZING A FLAT OR NON-CONTACT TYPE HOT PLATE

BACKGROUND OF THE INVENTION

1. Field of the Invention

The present invention relates to a sheet-decorating injection molding method for forming a resin molding decorated with patterns and letters by bonding a decorative sheet to the surface of a resin molding in a mold when forming the resin molding by injection molding, and a sheet-decorating injection molding machine for carrying the sheet-decorating injection molding method.

2. Description of the Related Art

Various sheet-decorating injection molding methods which bond a decorative sheet to the surface of a resin molding in a process of molding the resin molding in a mold by injection molding have been proposed. Most of those previously proposed sheet-decorating injection molding methods carry out all or some of the following steps (a) to (i) in that order, in order of different sequence of those steps, or carry out a plurality of steps among those steps (a) to (i) simultaneously or in parallel.

Step a: A sheet feed process for feeding a decorative sheet onto the parting surface of a movable mold Step b: A sheet fixing process for fixedly holding the decorative sheet on the parting surface of the movable mold Step c: A sheet softening process for softening the decorative sheet by heating the same by a hot plate or the like Step d: A sheet drawing process (sheet preforming process) for drawing the decorative sheet so that the decorative sheet extend along the inner surface of the female mold defining a cavity by vacuum forming or pneumatic forming (Preforming process)

Step e: A mold clamping process for moving the movable mold (usually, a female mold) toward the fixed mold to close the injection mold Step f: An injection molding process for forming a molding by injecting a fluid resin (molten resin) through the fixed mold into the cavity defined by the movable mold and the fixed mold Step g: A mold opening process for separating the movable mold from the fixed mold to open the injection mold Step h: A trimming process for removing unnecessary portions of the decorative sheet from a portion of the same bonded to the resin molding Step i: A molding removing process for removing a sheet-decorated molding from the injection mold A plurality of processes among the foregoing processes may be carried out simultaneously. For example, the sheet fixing process of Step b and the mold clamping process of Step e can be achieved simultaneously by fixedly holding the decorative sheet between the movable mold and the fixed mold by the mold clamping process of Step e. The sheet drawing process of Step d and the injection molding process of Step f can be achieved simultaneously if the decorative sheet is drawn by the heat and pressure of the molten resin injected into the cavity in the injection molding process.

Either a laminated decorative sheet or a transfer decorative sheet is used selectively as the decorative sheet according to the type of the sheet-decorated molding. If a laminated decorative sheet is used, the laminated decorative sheet is bonded integrally to the surface of the resin molding in a decorative layer. If a transfer decorative sheet is used, only a transfer layer, i.e., a decorative layer, of the transfer decorative sheet is transferred to the resin molding to form a decorative layer on the resin molding and a base sheet of the transfer decorative sheet is separated from the transfer layer.

Usually, the sheet-decorating injection molding machine which carries out sheet-decorating injection molding carries out the sheet fixing process of Step b and the sheet softening process of Step c prior to the sheet drawing process of Step e. Therefore, the sheet-decorating injection molding machine is provided with a sheet clamping means for fixedly holding the decorative sheet on the parting surface of the movable mold, and a hot plate for heating and softening the decorative sheet fixedly held in place by the sheet clamping means, capable of being moved near to and separated from the decorative sheet.

The sheet clamping means often is a three-dimensional sheet damper such as proposed in JP-A No. 7-227877 when a molding to be produced has a highly irregular shape or an arched profile, such as the shape of a control panel for a rice cooker. This previously proposed three-dimensional sheet damper has a frame-shaped sheet clamping part for fixedly pressing a decorative sheet on the parting surface of a movable mold, and a sheet pressing part having two-dimensionally curved or protruded shape for pressing a portion of the decorative sheet into a recess formed in the movable mold.

Usually, the hot plate is such as using infrared rays for heating. Representative previously proposed hot plates include a flat hot plate disclosed in, for example, JP-B No. 63-6339 or JP-A No. 5-301250, a curved (or polygonal) hot plate proposed by the applicant of this patent application in JP-A No. 7-227827, and a flexible hot sheet employing a flexible surface heating element proposed by the applicant of this patent application in JP-A No. 8-39602. The flat hot plate, the curved (or polygonal) hot plate and the flexible hot sheet has the following disadvantages.

If a molding to be produced has a highly irregular shape or an arched profile, most part of a decorative sheet to be bonded to the irregular surface of the molding to be produced is pressed into a recess formed in a movable mold before heating and softening the decorative sheet by the three-dimensional sheet damper so that the decorative sheet is deformed so as to conform approximately to the surface of the recess corresponding to the surface of the mold to be produced. Therefore, if the flat hot plate of JP-A-No. 5-301250 is employed for heating the thus deformed decorative sheet, the distances between the heating surface of the flat hot plate and portions of the decorative sheet are distributed in a wide distance distribution range; that is, a portion of the decorative sheet near the parting surface of the movable mold is at a short distance from the heating surface of the flat hot plate, while a portion of the decorative sheet pressed deep into the recess by the three-dimensional sheet damper is at a considerably long distance from the heating surface of the flat hot plate. Therefore, the difference in distance from the heating surface of the flat hot plate between a portion nearest to the heating surface of the flat hot plate and a portion farthest from the same is very large. Consequently, portions of the decorative sheet are heated at different temperatures distributed in a wide temperature distribution range, respectively, so that the portions of the decorative sheet are drawn irregularly, a pattern formed on the decorative sheet is deformed, the pattern is dislocated from a correct position on the molding and, if things come to the worst, the decorative sheet is creased or broken.

If the curved (or polygonal) hot plate of JP-A-No. 7-227827 is used, the difference between the maximum and the minimum distance between the decorative sheet and the curved (or polygonal) hot plate can be reduced and hence portions of the decorative sheet are heated respectively at temperatures distributed in a temperature distribution range narrower than that of the temperatures of portions of the decorative sheet heated by the flat hot plate. Thus, the curved (or polygonal) hot plate of JP-A-No. 7-227827 is able to heat the decorative sheet more uniformly than the flat hot plate of JP-A No. 5-301250. However, the curved (or polygonal) hot plate needs high manufacturing cost because its heating surface having a three-dimensional shape requires a costly manufacturing process, has a weight far greater than that of the flat hot plate, requiring a large driving means including a hydraulic cylinder actuator of a large capacity or the like for holding and moving the curved (or polygonal) hot plate between a standby position and a sheet heating position, requiring an increased space for installation and increasing equipment cost, and is capable of being applied only to producing moldings of dimensions in a narrow range and having limited shapes because the shape of its heating surface must conform to the shape of the recess of the movable mold and cannot be altered and, basically, conforms to the shape of only one molding. Thus, the curved (or polygonal) hot plate must be manufactured specially for one molding, which increases initial cost.

The flexible hot sheet of JP-A No. 8-39602 is capable of avoiding the problems in JP-A No. 5-301250 and JP-A No. 7-227827 to some extent. However, the flexible hot sheet needs a complicated, large-scale driving means for holding, guiding and moving the flexible hot sheet between a standby position and a sheet heating position inside a three-dimensional sheet damper increasing equipment cost, is liable to fail to function properly because the flexible hot sheet provided with a flexible surface heating element is deformed for every injection molding cycle and the surface heating element is liable to break due to fatigue, and the flexible surface heating element cannot be bent in a curvature exceeding a limit curvature thereof to deform the flexible surface heating element in a shape conforming to the surface of a molding having a shape having irregularities of curvatures exceeding the limit curvature of the flexible surface heating element.

SUMMARY OF THE INVENTION

The present invention has been made in view of the foregoing problems in the prior art and it is therefore an object of the present invention to provide a sheet-decorating injection molding machine provided with an improved hot plate capable of heating a decorative sheet in a comparatively uniform temperature distribution as compared with the prior art flat hot plate, having a simple, lightweight construction as compared with the prior art curved (or polygonal) hot plate, less expensive than the prior art curved (or polygonal) hot plate, capable of being used for molding moldings of sizes in a relatively wide range and of a variety of shapes, less subject to failure than the prior art flexible hot sheet, and capable of being moved between a standby position and a sheet heating position by a relatively small, simple driving means.

Another object of the present invention is to provide a sheet-decorating injection molding method to be carried out by the foregoing sheet-decorating injection molding machine of the present invention.

According to one aspect of the present invention, a sheet-decorating injection molding machine is provided with a hot plate comprising a first heating plate and a second heating plate joined together in a V-shape with their corresponding edges abutting on each other and their heating surfaces facing outside.

The hot plate of the present invention may be of either a contact heating type using heat conduction for heating a decorative sheet or a noncontact heating type using radiation heat or dielectric heating for heating a decorative sheet. The hot plate of the present invention is able to heat a decorative sheet most effectively by a noncontact heating method using infrared radiation heat or the like. The hot plate of the present invention can be relatively easily constructed by joining together two conventional flat hot plate in a V-shape, or by bending a conventional flat hot plate in a V-shape and holding the hot plate by a suitable holding means. The heating surface of the hot plate need not necessarily be a combination of two flat surfaces; the heating surface may be formed in a polygonal profile as shown in FIG. 6(A) or in a curved profile as shown in FIG. 6(B) according to the shape of the outer surface of a molding to which a decorative sheet is to be bonded. The shape of the heating surface of such a hot plate resembles the shape of the outer surface of a molding to which a decorative sheet is to be bonded (the shape of the surface of a recess defining a cavity) and the shape of a sheet pressing portion of a three-dimensional sheet clamper. Therefore, the difference between the maximum and the minimum distance between the heating surface of the hot plate and portions of a surface to be heated of a decorative sheet is relatively small and hence the hot plate having such a heating surface having a curved or polygonal profile is able to heat the decorative sheet more uniformly than the hot plate having a V-shaped heating surface consisting of two flat surfaces.

The above and other objects, features and advantages of the present invention will become more apparent from the following description taken in connection with the accompanying drawings.

BRIEF DESCRIPTION OF THE DRAWINGS

FIG. 3 is an enlarged perspective view similar to FIG. 2, of assistance in explaining the operation of the hot plate driving mechanism of FIG. 2;

FIGS. 6(A) and 6(B) are end views of hot plates in modifications;

FIG. 7 is a perspective view of a hot plate included in a sheet-decorating injection molding machine in a third embodiment according to the present invention;

DESCRIPTION OF THE PREFERRED EMBODIMENTS

Preferred embodiments of the present invention will be described hereinafter with reference to the accompanying drawings.

Figure 1:
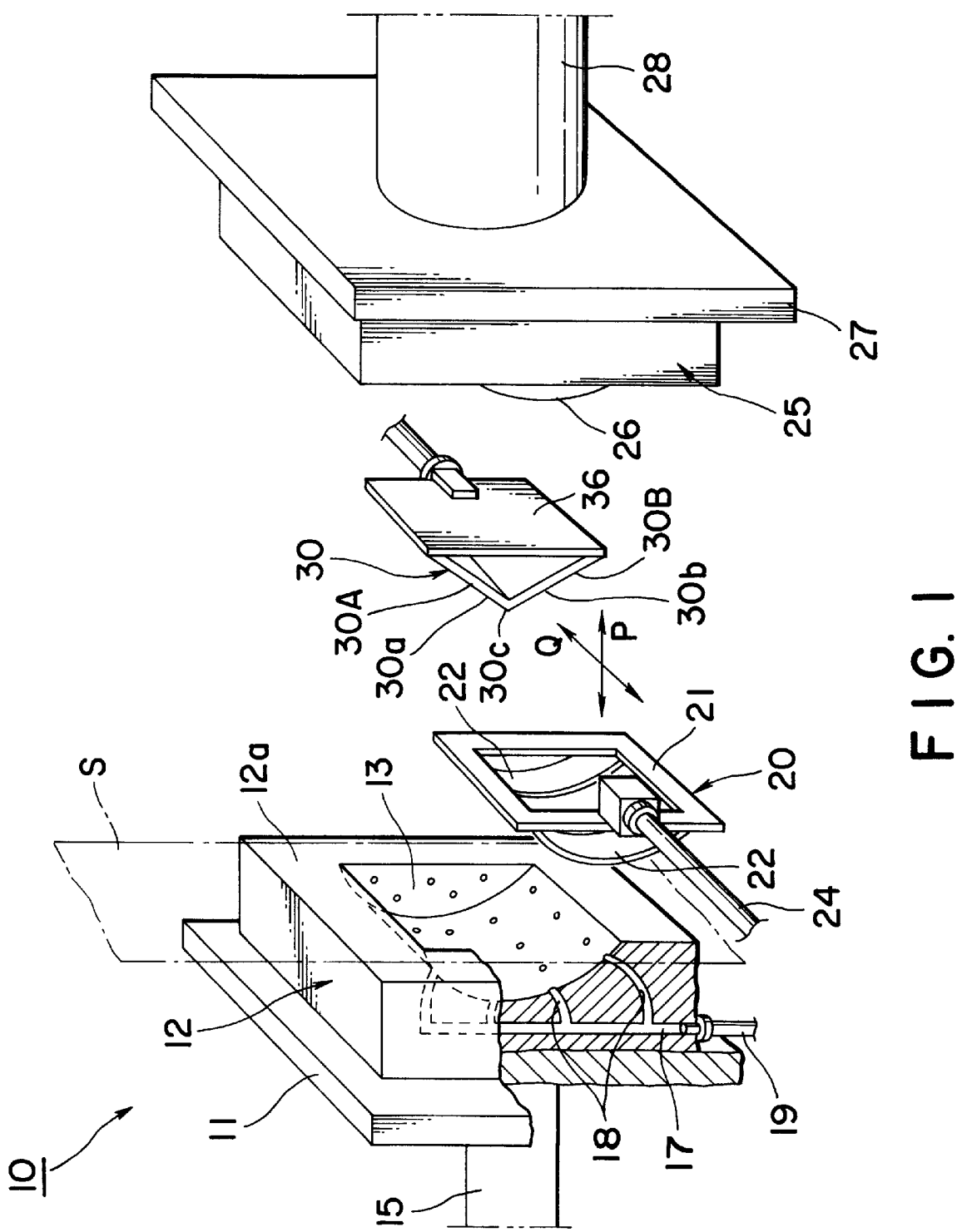
FIG. 1 is a fragmentary typical perspective view of an essential portion of a sheet-decorating injection molding machine in a preferred embodiment according to the present invention.
Figure 2:
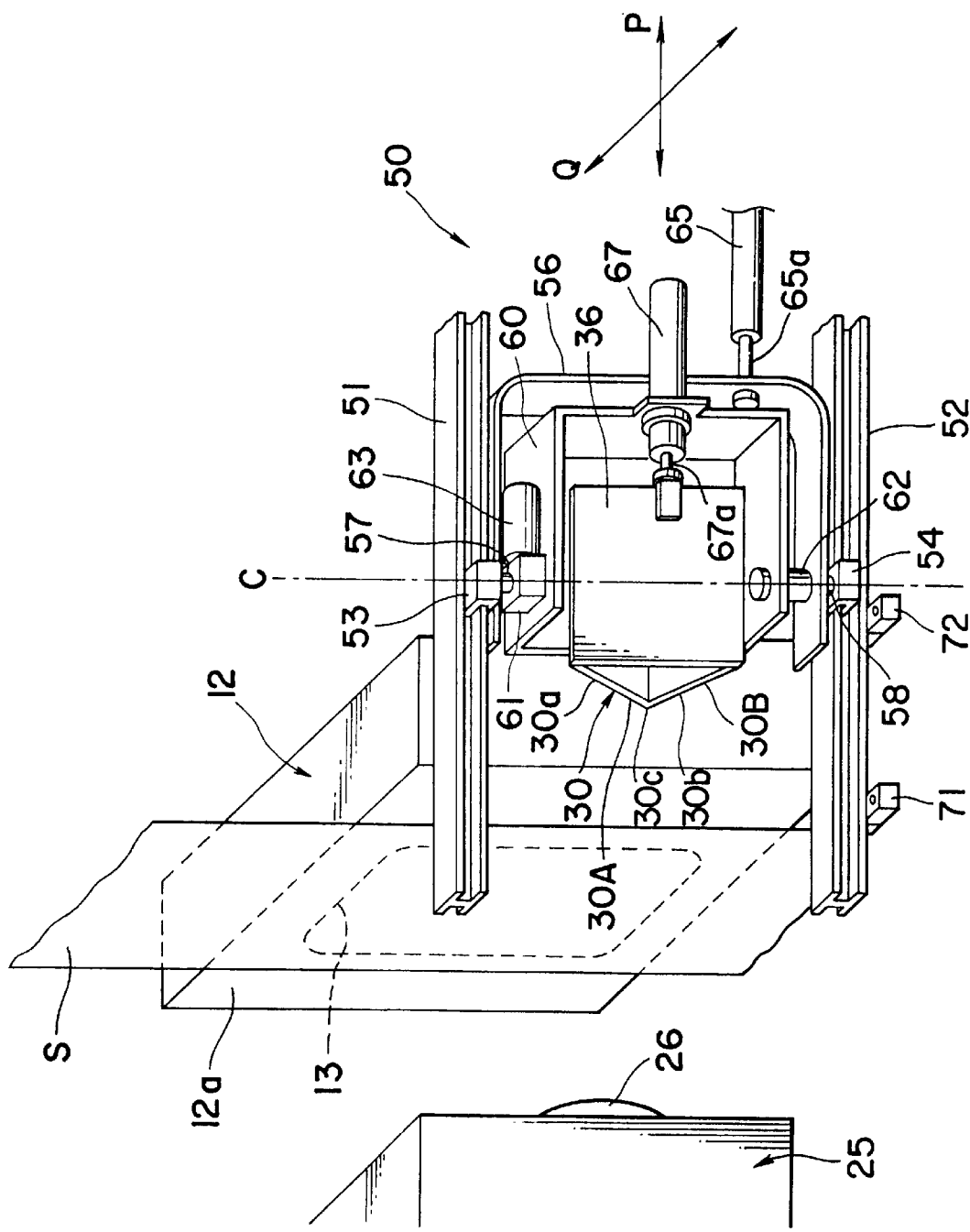
FIG. 2 is an enlarged perspective view of a hot plate driving mechanism included in the sheet-decorating injection molding machine of FIG. 1.

Referring to FIGS. 1 and 2, a sheet-decorating injection molding machine 10 in a first embodiment according to the present invention is provided with an injection mold having a movable mold (female mold) 12 and a fixed mold (male mold) 25, which are joined together to form a cavity corresponding to the shape of a molding to be produced. The movable mold 12 is fixedly mounted on a movable platen 11 which is moved by a ram 15 of a hydraulic cylinder actuator in horizontal directions as viewed in FIG. 1 to move the movable mold 12 toward and away from the fixed mold 25. The movable mold 12 is provided with a recess 13 having a cavity surface of a shape complementary to the shape of a surface of a molding to be molded therein, suction holes 18, a suction passage 17 connected to the suction holes 18 and a pipe 19 connected to an external vacuum pump, and an annular groove formed in its parting surface 12a so as to surround the recess 13 to hold an O ring, not shown, therein. The fixed mold 25 fixedly mounted on a stationary platen 27 to which an injection nozzle 28 included in an injection molding unit is fixed. The fixed mold 25 is provided with a core 26 of a shape corresponding the shape of the molding in its central portion, and a runner and a gate, not shown, through which a molten resin is injected into the cavity. The movable mold 12 and the fixed mold 25 may be disposed in a vertical arrangement and the movable mold 12 may be vertically moved toward and away from the fixed mold 25. The movable mold 12 and the fixed mold 25 are made of a metal, such as iron or copper, or a ceramic material. The fixed mold 25 may be provided with air supply holes for supplying compressed air into a cavity formed between the movable mold 12 and the fixed mold 25 for preforming a decorative sheet S held between the movable mold 12 and the fixed mold 25.

A three-dimensional sheet clamper 20 is disposed on one side of the injection mold. The sheet damper 20 has a sheet clamping member 21 having the shape of a substantially rectangular frame for fixedly pressing a marginal portion of a decorative sheet S on the parting surface 12a of the movable mold 12, and a pair of two-dimensionally curved or protruded pressing members 22 for pressing most part of the decorative sheet S excluding the marginal portion of the same into the recess of the female mold 12. The three-dimensional sheet damper 20 is driven by a hydraulic cylinder actuator 24 for movement along the parting surface 12a of the movable mold 12, i.e., in the directions of the arrows Q (FIG. 1) and in directions perpendicular to the parting surface 12a of the movable mold 12, i.e., in the directions of the arrows P (FIG. 1).

Figure 4:
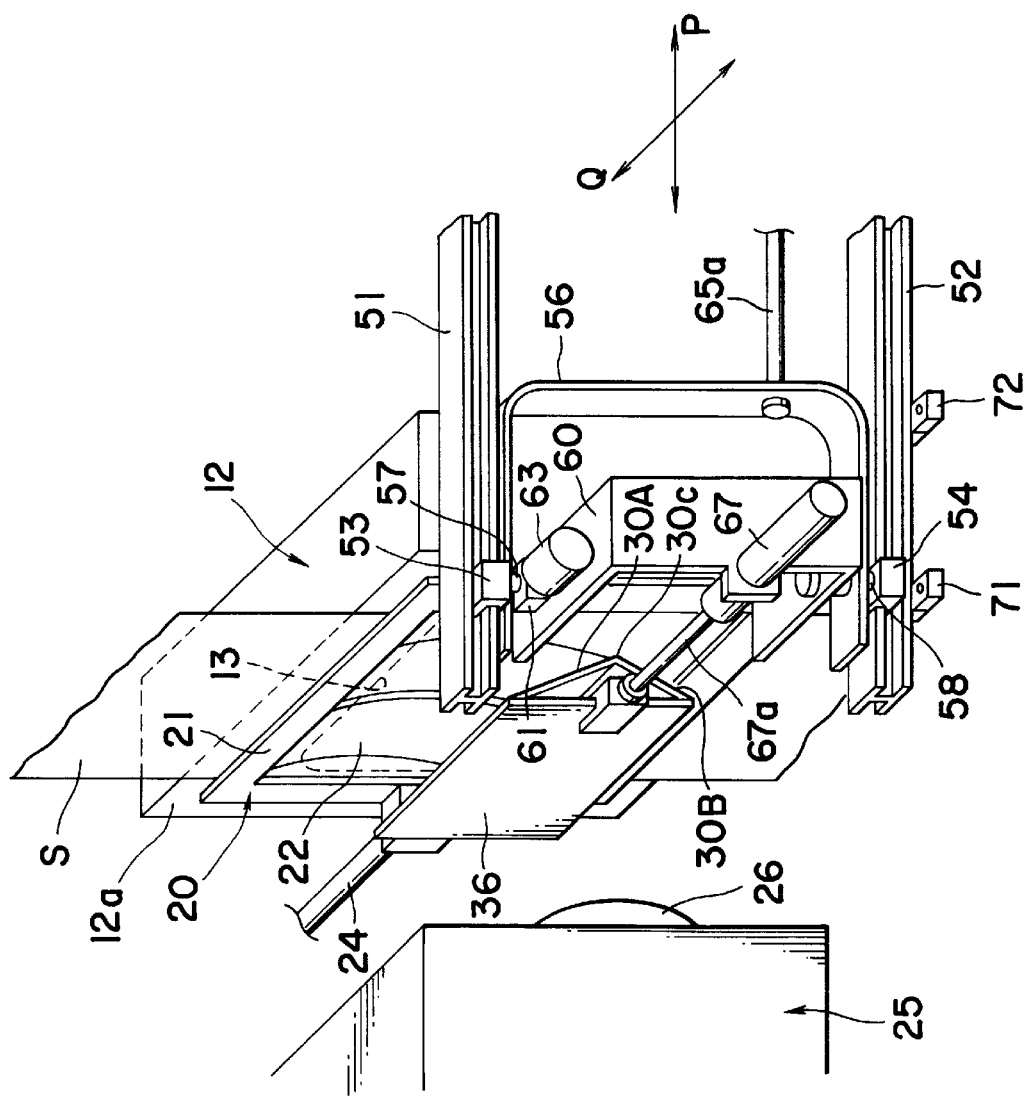
FIG. 4 is an enlarged perspective view similar to FIG. 2, of assistance in explaining the operation of the hot plate driving mechanism of FIG. 2.

A V-shaped hot plate 30 for heating and softening the decorative sheet S is disposed on the other side of the injection mold opposite the side on which the three-dimensional sheet damper 20 is disposed. As shown in FIGS. 2 to 4, the V-shaped hot plate 30 is held by a hot plate operating mechanism 50 so as to be moved in the directions of the arrows P and Q (FIG. 2). The V-shaped hot plate 30 is of a noncontact infrared heating type having a pair of flat heating plates, i.e., a first heating plate 30A and a second heating plate 30B, which are similar to a conventional flat hot plate. The first heating plate 30A and the second heating plate 30B are joined together in a V-shape having a ridge 30c with their corresponding edges abutting on each other and their heating surfaces 30a and 30b facing outside and making a predetermined angle therebetween. When heating the decorative sheet S by the V-shaped hot plate 30, the hot plate operating mechanism 50 holds the V-shaped hot plate 30 with its ridge 30c facing the recess 13 of the movable mold 12, and moves the V-shaped hot plate 30 toward and away from the recess 13 of the movable mold 12. After the completion of the heating of the decorative sheet S, the hot plate operating mechanism 50 retracts the V-shaped hot plate 30 from the space between the movable mold 12 and the fixed mold 25 to a standby position beside the injection mold as shown in FIG. 2. As shown in FIG. 2, the hot plate operating mechanism 50 comprises a parallel guide rails 51 and 52, such as H beams, disposed one above the other beside the movable mold 12 so as to extend horizontally in the directions of the arrows P, sliders 53 and 54 supported for sliding on the guide rails 51 and 52, respectively, a U-shaped support frame 56 having upper and lower arms, pivot pins 57 and 58 fixed to the upper and the lower arms of the support frame 56 and the sliders 53 and 54, respectively, a hot plate holding structure 60 having the shape of a box having an open left side and an open this side, as viewed in FIG. 2, a gear box 61 with locking mechanism rotatably supporting the upper wall of the hot plate holding structure 60 on the pivot pin 57, a bearing 62 rotatably supporting the lower wall of the hot plate holding structure 60 on the pivot pin 58, a motor 63 for turning the hot plate holding structure 60 selectively in opposite directions about the common axis of the pivot pins 57 and 58, a first hydraulic cylinder actuator 65 for moving the U-shaped support frame 56 along the guide rails 51 and 52 in the directions of the arrows P, and a second hydraulic cylinder actuator 67 for moving the V-shaped hot plate 30 out of and into the hot plate holding structure 60 through the left end, as viewed in FIG. 2, of the hot plate holding structure 60. The second hydraulic cylinder actuator 67 is fixed to the vertical side wall of the hot plate holding structure 60 with its longitudinal axis extending perpendicularly to the vertical side wall. The extremity of a piston rod 67a included in the second hydraulic cylinder actuator 67 is joined to a base plate 36 fixedly connected to the free edges of the first heating plate 30A and the second heating plate 30B of the V-shaped hot plate 30. Held on the lower guide rail 52 are a forward travel limiting sensor 71, such as a photoelectric relay, for detecting the U-shaped support frame 56 arrived at a limit of forward travel, i.e., a working position, and a backward travel limiting sensor 72, such as a photoelectric relay, for detecting the U-shaped support frame 56 arrived at a limit of backward travel, i.e., a standby position.

When the sheet-decorating injection molding machine operates, a decorative sheet S for one shot cycle is fed onto the parting surface 12a of the movable mold 12, the decorative sheet S is pressed fixedly against the parting surface 12a of the movable mold 12 by the three-dimensional sheet damper 20, and then the V-shaped hot plate 30 is moved near to the decorative sheet S held fixedly on the parting surface 12a by the three-dimensional sheet damper 20 to heat and soften the decorative sheet S. At the start of a hot softening process in which the decorative sheet S is heated and softened by the V-shaped hot plate 30, the piston rod 65a of the first hydraulic cylinder actuator 65 is fully retracted to hold the U-shaped support frame 56 supporting the hot plate holding structure 60 holding the V-shaped hot plate 30. Then, the piston rod 65a of the first hydraulic cylinder actuator 65 is projected to advance the U-shaped support frame 56 supporting the hot plate holding structure 60 holding the V-shaped hot plate 30 to the working position, i.e., the limit of forward travel. Upon the detection of the U-shaped support frame 56 arrived at the working position, the forward travel limiting sensor 71 stops the operation of the first hydraulic cylinder actuator 65 to stop the U-shaped support frame 56 at the working position in a plane beyond the parting surface 12a of the movable mold 12 toward the fixed mold 25 as shown in FIG. 3. Then, the motor 63 is actuated for operation in the normal direction of rotation to turn the hot plate holding structure 60 clockwise, as viewed from above, through an angle of 90° on the pivot pins 57 and 58 to position the V-shaped hot plate 30 on the side of the fixed mold 25 relative to the three-dimensional sheet damper 20 holding the decorative sheet S on the movable mold 12 as shown in FIG. 3. Subsequently, the piston rod 67a of the second hydraulic cylinder actuator 67 is stretched out by a predetermined length to locate the V-shaped hot plate 30 directly opposite to the three-dimensional sheet clamper 20 and the recess 13 of the movable mold 12 as shown in FIG. 4. Then, the piston rod 65a of the first hydraulic cylinder actuator 65 is retracted by a predetermined length to reverse the U-shaped support frame 56 by a predetermined distance in the direction of one of the arrows P. Consequently, the V-shaped hot plate 30 is moved toward a decorating portion Sa to be heated of the decorative sheet S so that the ridge 30c moves past a plane including the clamping member 21 of the three-dimensional sheet damper 20 toward the movable mold 12 to a position at a minimum distance $\Delta Y_{min}$ from the decorating portion Sa as shown in FIG. 8(B).

The functions and effects of the V-shaped hot plate 30 positioned at a heating position shown in FIG. 8(B) employed in the sheet-decorating injection molding machine 10 of the present invention will be explained in comparison with those of a conventional flat hot plate 130 having a flat heating surface 130a and positioned at a heating position shown in FIG. 8(A) and a conventional curved hot plate 230 having a curved heating surface 230a of a semielliptical cross section and positioned at a heating position shown in FIG. 8(C). The maximum distances $\Delta X_{max}$, $\Delta Y_{max}$ and $\Delta Z_{max}$ between portions of the heating surfaces 130a, 30a and 230a of the hot plates 130, 30 and 230 farthest from the decorating portion Sa of the decorative sheet S and the decorating portion Sa of the decorative sheet S, and the minimum distances $\Delta X_{min}$, $\Delta Y_{min}$ and $\Delta Z_{min}$ between portions of the heating surfaces 130a, 30a and 230a of the hot plates 130, 30 and 230 closest to the decorating portions Sa of the decorative sheet S and the decorating portion Sa of the decorative sheet S meet the following expression.

$$\Delta X_{max} - \Delta X_{min} > \Delta Y_{max} - \Delta Y_{min} > \Delta Z_{max} - \Delta Z_{min} = 0$$

Figure 8A:
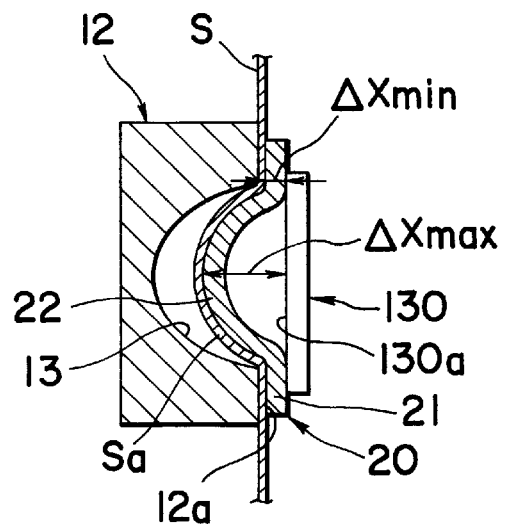
FIGS. 8(A), 8(B) and 8(c) are sectional views of assistance in comparatively explaining the respective operations and effects of a conventional flat hot plate, a V-shaped hot plate of the present invention, and a conventional curved hot plate, respectively.
Figure 8B:
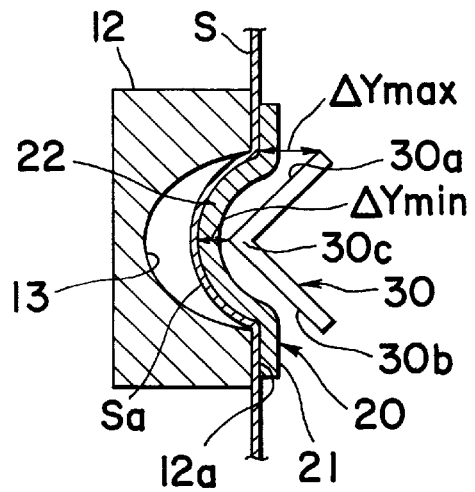
Figure 8C:
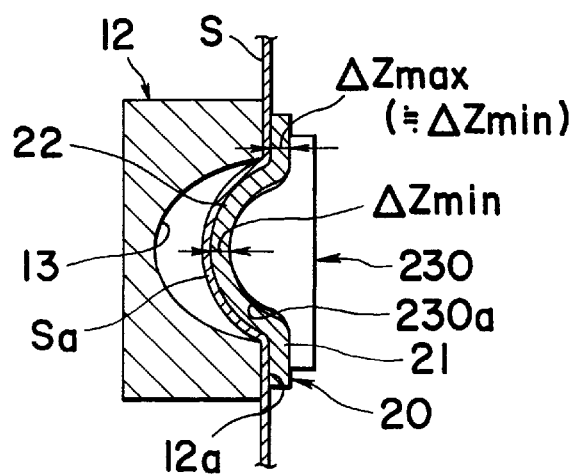
Figure 9:
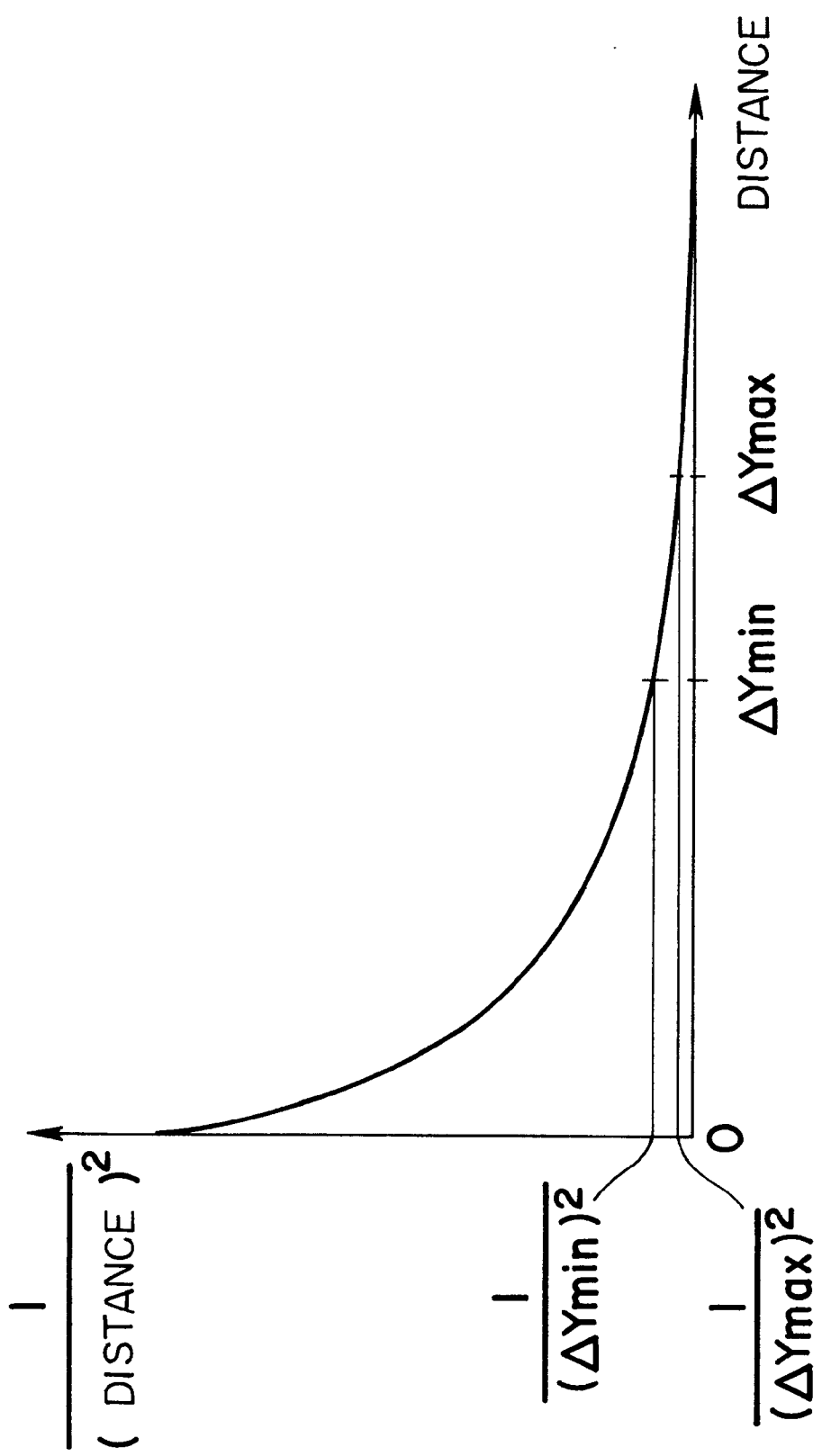
FIG. 9 is a graph of assistance in explaining the hot plate employed in a sheet-decorating injection molding machine of the present invention.

As is obvious from the comparative observation of FIGS. 8(A) and 8(B), the difference $\Delta y$ between the maximum distance $\Delta Y_{max}$ and the minimum distance $\Delta Y_{min}$, i.e., $\Delta y = \Delta Y_{max} - \Delta Y_{min}$, when the V-shaped hot plate 30 of the present invention is employed is smaller than the difference $\Delta x$ between the maximum distance $\Delta X_{max}$ and the minimum distance $\Delta X_{min}$, i.e., $\Delta x = \Delta X_{max} - \Delta X_{min}$, when the conventional flat hot plate 130 is employed. Therefore, the V-shaped hot plate 30 of the present invention is able to heat the decorating portion Sa of the decorative sheet S more uniformly than the prior art flat hot plate 130. As is obvious from the comparative observation of FIGS. 8(B) and 8(C), the difference $\Delta y$ between the maximum distance $\Delta Y_{max}$ and the minimum distance $\Delta Y_{min}$, i.e., $\Delta y = \Delta Y_{max} - \Delta Y_{min}$, when the V-shaped hot plate 30 of the present invention is employed is greater than the difference $\Delta z$ between the maximum distance $\Delta Z_{max}$ and the minimum distance $\Delta Z_{min}$, i.e., $\Delta z = \Delta Z_{max} - \Delta Z_{min}$, when the conventional curved hot plate 230 is employed. Therefore, the V-shaped hot plate 30 of the present invention is heats the decorating portion Sa of the decorative sheet S less uniformly than the conventional curved hot plate 230. However, the difference in heating performance between the V-shaped hot plate 30 and the conventional curved hot plate 230 is insignificant when the V-shaped hot plate 30 and the curved hot plate 230 are is used in a noncontact heating mode, i.e., $\Delta Y_{min} > 0$ and $\Delta Z_{min} > 0$, because the intensity of radiant infrared rays, i.e., radiation energy density, on the decorating portion Sa of the decorative sheet S irradiated with infrared radiation is inversely proportional to the square of the distance between the heating surface (30a, 230a) of the hot plate (30, 230).

Radiation energy density on the decorating portion Sa of the decorative sheet S varies in inverse proportion to the square of the distance $\Delta Y$ between the decorating portion Sa of the decorative sheet S and the heating surface 30a (30b), and the difference between the reciprocal of the square of the minimum distance, i.e., $1/\Delta Y_{min}^2$, and the reciprocal of the square of the maximum distance, i.e., $1/\Delta Y_{max}^2$ decreases with the increase of the distance $\Delta Y$ (FIGS. 8(A), 8(B) and 8(C) and FIG. 9). Therefore, the greater the maximum distance $\Delta Y_{max}$ and the minimum distance $\Delta Y_{min}$, the smaller is the difference between $1/\Delta Y_{min}^2$ and $1/\Delta Y_{max}^2$ and the less is influence of the distribution of the distance $\Delta Y$ on the distribution of the radiation energy density. Therefore, the performance of the V-shaped hot plate 30 employed in the sheet-decorating injection molding machine 10 of the present invention, which has the heating surfaces 30a and 30b formed in a shape not perfectly conforming the that of the decorating portion Sa of the decorative sheet S and heats the decorative sheet S by radiation, in uniformly heating the entire decorating portion Sa of the decorative sheet S compares favorably with that of a conventional noncontact hot plate 230 (FIG. 8(C)) having a heating surface 230a of a shape conforming to that of the decorating portion Sa of the decorative sheet S. The V-shaped hot plate 30 employed in the sheet-decorating injection molding machine 10 of the present invention is simple and lightweight in construction and inexpensive as compared with the conventional hot plate 230 having a curved or polygonal heating surface 230a, is less subject to fatigue failure and the like than the conventional flexible hot sheet because the V-shaped hot plate 30 need not be frequently bent, and can be moved between the standby position and the sheet heating position by a relatively small, simple driving mechanism.

A sheet-decorating injection molding method in accordance with the present invention to be carried out by the sheet-decorating injection molding machine thus constructed comprises a sheet feed process for feeding a decorative sheet onto the parting surface 12a of the movable mold 12, a sheet clamping process for fixedly holding the decorative sheet S on the parting surface 12a of the movable mold 12 by the three-dimensional sheet damper 20, a sheet softening process for heating and softening the decorative sheet S by the V-shaped hot plate 30 by moving the V-shaped hot plate 30 by the hot plate operating mechanism 50 near to the decorative sheet S held on the parting surface 12a of the movable mold 12 by the three-dimensional sheet damper 20, a drawing process for drawing the decorative sheet S into the recess 13 of the movable mold 12 by sucking air through the suction holes 18 for vacuum forming, a mold clamping process for clamping the injection mold to form a cavity therein by moving the movable mold 12 toward and joining the same to the fixed mold 25, an injection molding process for injecting a fluid resin through the fixed mold 25 into the cavity so as to fill up the cavity with the fluid resin and solidifying the resin filling up the cavity, a mold opening process for opening the injection mold by separating the movable mold 12 from the fixed mold 25, and a molding removing process for removing a sheet-decorated molding decorated by the decorative sheet S from the injection mold. These processes are carried out sequentially.

The decorative sheet S is provided with positioning marks, such as marks "+", marks "−" or marks "I" for the accurate positioning thereof relative to the recess 13 of the movable mold 12 (resin molding to be formed). The operation of a decorative sheet feed mechanism may be controlled on the basis of the output signals of image sensors or photosensors mounted on the movable mold 12 to detect the positioning marks formed on the decorative sheet S. If the decorative sheet S is one which does not need to be positioned very accurately, such as an unfigured decorative sheet or a decorative sheet carrying a repetitive pattern, a predetermined length of the pattern sheet may be fed by controlling a stepping motor or the like included in the decorative sheet feed mechanism.

The decorative sheet S may be either a laminated decorative sheet to be integrally incorporated into a resin molding or a transfer decorative sheet having a decorative layer and a base sheet supporting the decorative layer and to be removed from a resin molding after the decorative layer has been transferred to the resin molding. The base sheet may be a sheet of thermoplastic resin, such as a polyvinyl chloride resin, an acrylic resin, a polystyrene resin, an ABS resin, a polycarbonate resin, a polyester resin, a polypropylene resin or the like, and of a thickness in the range of about 20 to about 500 (m. The decorative layer may be a film of a visually aesthetic design, such as a film of a printed pattern, a colored or transparent film or a metal thin film, or a functional film, such as a hard film, an antidim film or a conductive film.

Figure 5:
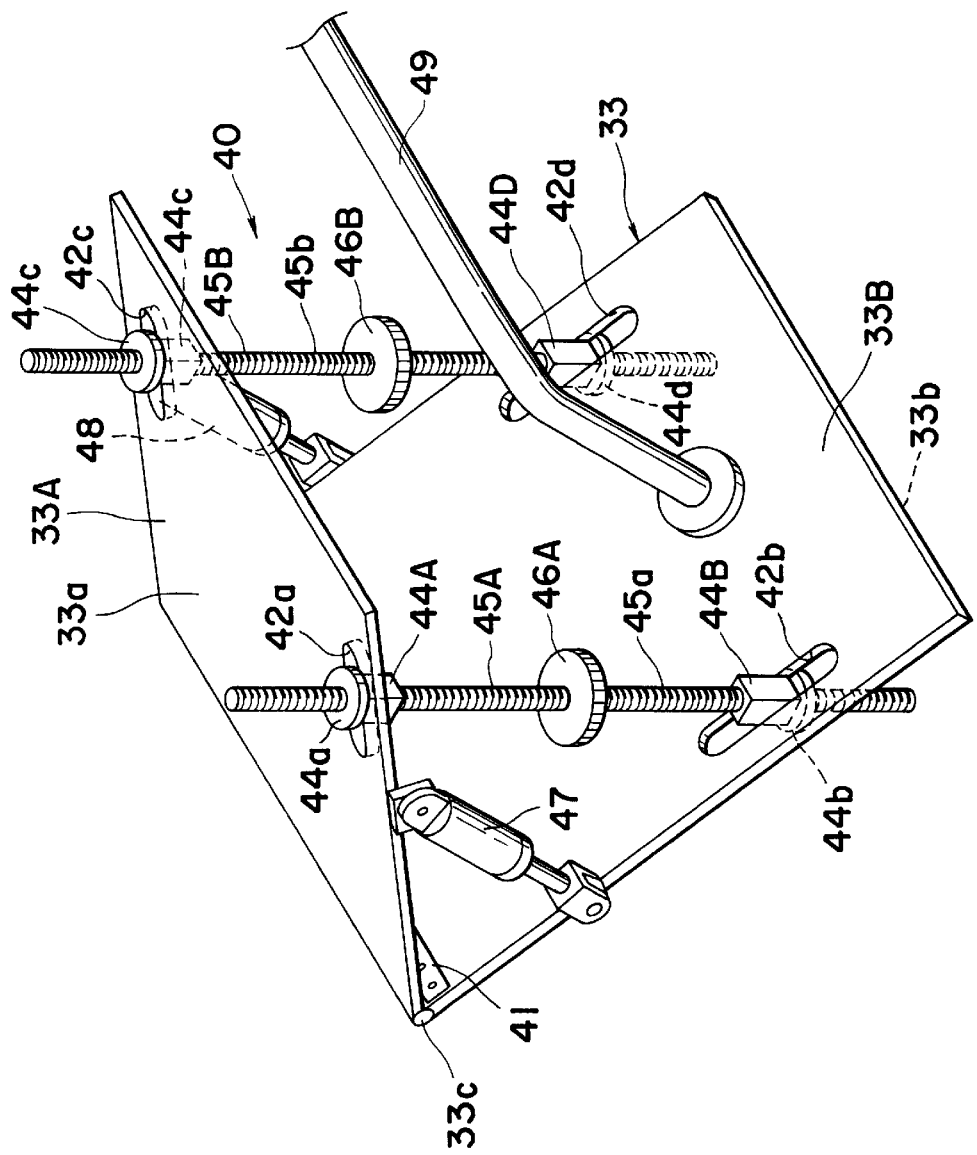
FIG. 5 is a perspective view of a hot plate included in a sheet-decorating injection molding machine in a second embodiment according to the present invention.

A sheet-decorating injection molding machine in a second embodiment according to the present invention is the same in construction as the sheet-decorating injection molding machine 10 in the first embodiment except that the former employs a hot plate 33 shown in FIG. 5. Therefore, only the hot plate 33 will be described and the description of the rest of the components will be omitted.

The hot plate 33 is fabricated by connecting a first heating plate 33A and a second heating plate 33B at their corresponding edges in a V-shape by hinges 41 so that the heating plates 33A and 33B are able to swing relative to each other on the hinges 41 so as to form a desired angle therebetween, and combining an angle adjusting mechanism 40 for adjusting the angle between the heating plates 33A and 33B with the heating plates 33A and 33B. The angle adjusting mechanism 40 has a pair of screw rods 45A and 45B fixedly provided at their middles with angle adjusting knobs 46A and 46B, respectively. Slots 42a and 42c are formed near the free end of the first heating plate 33A at positions near the opposite side edges of the same, respectively, and slots 42b and 42d are formed near the free end of the second heating plate 33B at positions near the opposite side edges of the same, respectively. Square nuts 44A, 44B, 44C and 44D provided with flanges 44a, 44b, 44c and 44d are slidably fitted in the slots 42a, 42b, 42c and 42d, respectively. The square nuts 44A, 44B, 44C and 44D are restrained from turning. The square nuts 44A and 44B are provided with internal threads of opposite hands, respectively, and the square nuts 44C and 44D are provided with internal threads of opposite hands, respectively. For example, the square nuts 44A and 44C are provided with a right-hand internal thread, and the square nuts 44B and 44D are provided with a left-hand internal thread. The screw rods 45A and 45B are provided with external threads 45a and 45b, respectively. The square nuts 44A and 44B are screwed on opposite end portions of the screw rod 45A, respectively, and the square nuts 44C and 44D are screwed on opposite end portions of the screw rod 45B, respectively. Each of gas dampers 47 and 48 has one end pivotally joined to a portion of the first heating plate 33A near the edge 33c of the hot plate 33 and the other end pivotally joined to a portion of the second heating plate 33B near the edge 33c. The gas dampers 47 and 48 bias the first heating plate 33A and the second heating plate 33B away from each other. One end of an L-shaped rod 49 for connecting the hot plate 33 to the second hydraulic cylinder actuator 67 is joined to a portion of the second heating plate 33B near the free end.

The angle adjusting knobs 45A and 45B are turned in one direction to draw the square nuts 44A and 44B toward each other and the square nuts 44C and 44D toward each other, so that the first heating plate 33A and the second heating plate 33B are turned toward each other against the force exerted thereon by the gas dampers 47 and 48 to reduce the angle between the first heating plate 33A and the second heating plate 33B. The angle adjusting knobs 45A and 45B are turned in the other direction to move the square nuts 44A and 44B away from each other and the square nuts 44C and 44D away from each other, so that the first heating plate 33A and the second heating plate 33B are turned away from each other by the force exerted thereon by the gas dampers 47 and 48 to increase the angle between the first heating plate 33A and the second heating plate 33B. The screw rods 45A and 45B may be turned by either operating the angle adjusting knobs 46A and 46B by hand as mentioned above or turning the screw rods 45A and 45B by a driving means, such as a motor. Since the angle between the first heating plate 33A and the second heating plate 33B can be adjusted by means of the angle adjusting mechanism 40, the hot plate 33 is more versatile and can be more properly applied to heating decorative sheets for forming sheet-decorated moldings of shapes and dimensions in expanded ranges than the hot plate having the heating plates fixedly joined together in a V-shape having a fixed apex angle. Therefore, the employment of the hot plate 33 reduces the equipment cost.

A sheet-decorating injection molding machine in a third embodiment according to the present invention is the same in construction as the sheet-decorating injection molding machine 10 in the first embodiment except that the former employs a hot plate 34 shown in FIG. 7. Therefore, only the hot plate 34 will be described and the description of the rest of the components will be omitted.

The hot plate 34 is fabricated by connecting a first heating plate 34A and a second heating plate 34B at their corresponding edges by hinges 81 in a V-shape so that the heating plates 34A and 34B are able to swing relative to each other on the hinges 81 so as to form a desired angle therebetween, and combining an angle adjusting mechanism 80 for adjusting the angle between the heating plates 34A and 34B with the heating plates 34A and 34B. The angle adjusting mechanism 80 has a stay rod 82 having one end pivotally connected to the inner surface of the first heating plate 34A, a rack 84 having one end pivotally joined to the other end of the stay rod 82, a guide member 86 attached to the inner surface of the second heating plate 34B so as to define a guide groove for guiding the rack 84 for sliding movement in a plane perpendicular to the first heating plate 34A and the second heating plate 34B, a geared motor 88 with locking mechanism, a pinion 87 mounted on the output shaft 88a of the geared motor 88 and engaged with the rack 84, and a bearing member 82 for supporting the output shaft 88a of the geared motor 88.

The output shaft 88a of the geared motor 88 is rotated in one direction, for example, in the normal direction, to drive the rack 84 by the pinion 87 for outward sliding movement, i.e., obliquely downward movement as viewed in FIG. 7, so that the first heating plate 34A and the second heating plate 34B are turned toward each other to reduce the angle between the first heating plate 34A and the second heating plate 34B. The output shaft 88a of the geared motor 88 is rotated in the other direction, for example, in the reverse direction, to drive the rack 84 by the pinion 87 for inward sliding movement, i.e., obliquely upward movement as viewed in FIG. 7, so that the first heating plate 34A and the second heating plate 34B are turned away from each other to increase the angle between the first heating plate 34A and the second heating plate 34B.

Since the angle between the first heating plate 34A and the second heating plate 34B can be automatically changed by the angle adjusting mechanism 80, the hot plate 34, similarly to the hot plate 33 provided with the angle adjusting mechanism 40, is more versatile and can be more properly applied to heating decorative sheets for forming sheet-decorated moldings of shapes and dimensions in expanded ranges than the hot plate having the heating plates fixedly joined together in a V-shape having a fixed apex angle. Therefore, the employment of the hot plate 33 reduces the equipment cost. As shown in FIG. 7, the outer surfaces of the respective end portions of the heating plates 34A and 34B on the side of a ridge 34c are tapered toward the ridge 34c not to form an ineffective heating zone, i.e., a zone between the corresponding edges of the heating plates 34A and 34B even if the angle between the heating plates 34A and 34B is varied.

Figure 10:
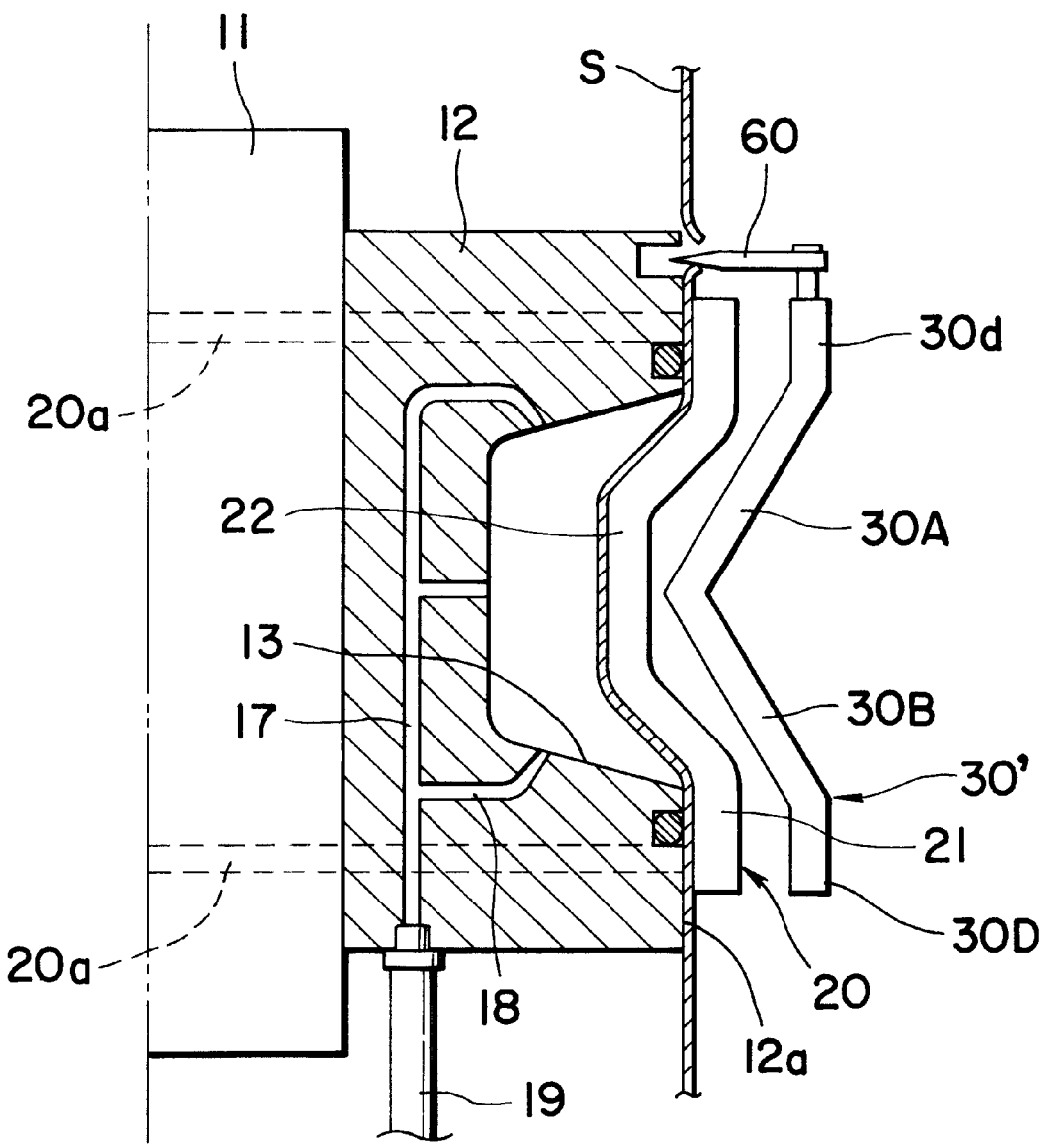
FIG. 10 is a fragmentary sectional view of a sheet-decorating injection molding machine of a present invention provided with a hot plate provided with a sheet cutter, and a sheet damper driven for movement by rods.

If a decorative sheet S is fed in a web of successive decorative sheets S, the decorative sheet S for one shot cycle may be cut off the web with a sheet cutter 90 held on one end of a hot plate 30' on the decorative sheet feed side as shown in FIG. 10 simultaneously with the advancement of the hot plate 30' toward the decorative sheet S. The decorative sheet S may be cut off the web with the sheet cutter 90 immediately before, simultaneously with or immediately after the stop of the hot plate 30' at a sheet heating position, provided that the decorative sheet S is cut off the web at time in a period between the completion of a sheet holding operation of a three-dimensional sheet damper 20 for fixedly holding the decorative sheet S on the parting surface 12a of the movable mold 12 and the completion of a heating operation of the hot plate 30' for heating the decorative sheet S. When the leading decorative sheet S is thus cut off the web of decorative sheets S before heat is applied thereto, decorative sheets S succeeding the leading decorative sheet S held on the movable mold 12 are not subjected to the adverse effects of heat applied to the leading decorative sheet S held on the movable mold 12, such as inducing thermal stress in the succeeding decorative sheets S and straining the succeeding decorative sheets S. The sheet cutter 90 may be provided with an edge tool or a heating wire.

The three-dimensional sheet damper 20 shown in FIG. 10 is connected to four rods 20a slidably fitted in through holes formed in the movable mold 12 and interlocked with an ejector. The three-dimensional sheet damper 20 is moved toward or away from the parting surface 12a of the movable mold 12 to hold the decorative sheet S on the movable mold 12 or to release the decorative sheet S.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. In a sheet-decorating injection molding machine, a V-shaped hot plate for heating a decorative sheet, said hot plate comprising:

a first flat heating plate and a second flat heating plate joined together at corresponding edges of the first and second heating plates such that an acute angle is formed between a first surface of said first heating plate and a first surface of said second heating plate, and wherein each of said heating plates comprises a flat heating surface facing away from said first surfaces so that an obtuse angle is formed between the flat heating surfaces of said heating plates;

wherein the hot plate having first and second flat heating plates is a non-contact type of hot plate which is not in contact with said decorative sheet.

2. The sheet-decorating injection molding machine according to claim 1, wherein the first and second heating plates are so constructed that the angle between the first and the second heating plates is variable.

3. The sheet-decorating injection molding machine according to claim 2, wherein the corresponding edges of the first and the second heating plates are joined together by a hinge, and an angle adjusting mechanism for turning the first and the second heating plates toward and away from each other to adjust the angle between the first and the second heating plates is combined with the hot plate.

4. A sheet-decorating injection molding machine comprising:

an injection mold having a male mold, and a female mold with a parting surface and a recess capable of being moved toward and away from the male mold;

a sheet clamping means capable of fixedly holding a decorative sheet on the parting surface of the female mold and of being moved along a line that is perpendicular to the parting surface of the female mold;

a V-shaped hot plate having a first flat heating plate and second flat heating plate joined together at corresponding edges of the first and second heating plates such that an acute angle is formed between a first surface of said first heating plate and a first surface of said second heating plate, said hot plate being positioned with the first and the second heating plates facing the recess formed in the female mold and each of the first and second heating plates having a flat heating surface facing away from said first surfaces so that an obtuse angle is formed between the flat heating surfaces of said heating plates;

a hot plate driving means for moving the hot plate toward the recess of the female mold to heat the decorative sheet held on the parting surface of the female mold and for moving the hot plate away from the female mold and to a standby position outside the injection mold; and an injection unit for injecting a fluid resin into a cavity formed by joining together the female mold and the male mold;

wherein the hot plate is moved by the hot plate driving means toward and away from the decorative sheet fixedly held on the female mold by the sheet clamping means on the parting surface of the female mold.

5. The sheet-decorating injection mold machine according to claim 4, wherein the sheet clamping means comprises a three-dimensional sheet damper having a sheet clamping part for fixedly pressing the decorative sheet against the parting surface of the female mold, and a curved or protruded sheet pressing part for pushing part of the decorative sheet into the recess of the female mold.

6. The sheet-decorating injection mold machine according to claim 4, wherein the first and second heating plates are so constructed that an angle between the first and second heating plates is variable.

7. The sheet-decorating injection mold machine according to claim 4, wherein the corresponding edges of the first and second heating plates are joined together by a hinge, and an angle adjusting mechanism for turning the first and second heating plates toward and away from each other to adjust the angle between the first and second heating plates is combined with the hot plate.

8. The sheet-decorating injection mold machine according to claim 4, wherein the hot plate driving means comprises a guide rail disposed beside the female mold and extending in a direction perpendicular to the parting surface of the female mold, and a hot plate holding structure movably supported by the guide rail for holding the hot plate through a hydraulic cylinder actuator.

9. The sheet-decorating injection molding machine according to claim 8, wherein the hot plate driving means further comprises a support frame desposed between the guide rail and the hot plate holding structure for rotatably supporting the hot plate holding structure, and a motor for turning the hot plate holding structure.

* * * * *